United States Patent
Yamaji et al.

(10) Patent No.: US 6,414,762 B1
(45) Date of Patent: Jul. 2, 2002

(54) OPTICAL INFORMATION RECORDING AND REPRODUCING APPARATUS USING A HOLOGRAPHIC MEMORY

(75) Inventors: Takashi Yamaji; Tomomitsu Kouno; Hideki Hatano; Yoshihisa Itoh; Satoru Tanaka; Hajime Matsushita, all of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/651,739

(22) Filed: Mar. 23, 2000

(30) Foreign Application Priority Data

Mar. 30, 1999 (JP) .......................................... 11-088415

(51) Int. Cl.[7] .............................. G03H 1/02; G03H 1/04
(52) U.S. Cl. ................................. 359/7; 359/3; 359/35; 359/1; 430/1; 430/2
(58) Field of Search ........................... 359/3, 7, 10, 11, 359/12, 30, 15, 22; 430/1, 2, 35

(56) References Cited

U.S. PATENT DOCUMENTS

| 5,388,105 A | 2/1995 | Takagi et al. ............ 369/44.32 |
| 5,392,268 A | 2/1995 | Rokutan ...................... 369/54 |
| 5,467,330 A | 11/1995 | Ishida et al. .................. 369/48 |
| 5,612,812 A | * 3/1997 | Zhou et al. .................... 359/10 |
| 5,665,493 A | * 9/1997 | Bai et al. ........................ 359/7 |
| 5,844,700 A | * 12/1998 | Jeganathan et al. ............. 359/7 |

* cited by examiner

*Primary Examiner*—Audrey Chang
(74) *Attorney, Agent, or Firm*—Morgan, Lewis & Bockius LLP

(57) ABSTRACT

An optical information recording and reproducing apparatus, which detachably supports a holographic memory formed of a photorefractive crystal, includes a portion for supplying a coherent reference light beam at a first wavelength into the holographic memory; a portion for supplying a coherent signal light beam at the first wavelength, modulated in accordance with image data, into the memory to produce an optical interference pattern with the reference light within the memory; a portion for supplying a gate light beam at a second wavelength into the memory for activating or deactivating an index grating in accordance with the presence or absence of the optical interference pattern to enhance a photo-sensitivity of the memory; a detector for detecting diffraction light from the index grating of the memory by the irradiation of the reference light beam; and a portion for changing and regulating a light intensity of the gate light beam.

5 Claims, 4 Drawing Sheets

OPTICAL INFORMATION RECORDING AND REPRODUCING APPARATUS USING A HOLOGRAPHIC MEMORY

BACKGROUND OF THE INVENTION

1. Field of the Invention

The present invention relates to a volume holographic memory and an optical information recording and reproducing apparatus using the volume holographic memory.

2. Description of the Related Art

Conventionally, a holographic memory system is known as a digital recording system using the principle of holography. The holographic memory system records digital data on a memory medium made of a photorefractive crystalline such as lithium niobate ($LiNbO_3$) or the like, and reproduces the data from the same. The photorefractive effect is a phenomenon in such that electric charges generated by photo-excitation move within a crystal thereby to form a spatial electric field distribution, which combines with a primary electro-optical effect i.e., Pockels effect to change a refractive index distribution in the crystal. In a ferroelectric crystal or the like exhibiting the photo-refractive effect, its change of the refractive index is responsive even to a fine optical input pattern of 1,000 lines or more per one millimeter, and this effective action is generated at a response speed on the order of microseconds to seconds in real time, though the response speed varies depending on kinds of materials. Therefore, a variety of applications for such crystals has been studied as a real time hologram medium which does not require any developing. The holographic memory system is capable of recording and reproducing data on a two-dimensional plane page unit, and also performing a multiple recording with use of a plurality of the page units. The volume holographic memory is designed to enable three-dimensional recording with a crystal medium being of a three-dimensional shape such as a rectangular parallelepiped or the like. In the volume holographic memory, which is one type of Fourier transform holograms, data is recorded at every two-dimensional image page unit in a dispersed manner within a three-dimensional space of the volume holographic memory. In the following, the outline of the holographic memory system will be described with reference to FIG. 1.

Referring to FIG. 1, an encoder 25 translates digital data to be recorded in a volume holographic memory 1 into a dot-pattern image consisting of light and dark spots arranged in a plane, and rearranges the image in a data arrangement, for example, a data array of 480 pixels in the vertical direction and 640 pixels in the horizontal direction to generate a unit page sequence data. The unitary page sequence data is supplied to a spatial light modulator (SLM) 12 including a panel of a transmission type Thin Film Transistor (TFT) liquid crystal display (hereinafter also called simply as "LCD").

The spatial light modulator 12 has a modulation unit for performing a modulation processing of 480 pixels in a line and 640 pixels in a row which corresponds to one unit page, and optically modulates a light beam into an on/off signal of spatial light in accordance with the unit page sequence data from the encoder 25, and guides the modulated light beam, i.e., signal light beam to a lens 13. More specifically, the spatial light modulator 12 passes therethrough the light beam in response to a logical value "1" of the unit page sequence data, which is an electric signal, and shuts off the light beam in response to a logical value "0" thereby to accomplish the electro-optical conversion in accordance with the contents of respective bits in the unit page data. Accordingly, the signal light beam including the unit page sequence is generated by modulation of the light beam.

The signal light beam is incident upon the volume holographic memory 1 through the lens 13. In addition to the signal light beam, a reference light beam is incident upon the volume holographic memory 1 at an angle β (hereinafter, referred to as "incident angle β") relative to a predetermined baseline perpendicular to an optical path of the signal light beam.

Both the signal light beam and the reference light beams interfere with each other within the volume holographic memory 1, and the resulting interference fringes are stored as a refractive index grating within the volume holographic memory 1, whereby recording of data is effected. Also, when the volume holographic memory 1 is irradiated multiple times with the reference light beam at different incident angles β to record a plurality of two-dimensional plane data in an angle multiplexing form, a recording of three-dimensional data can be accomplished.

When reproducing the recorded data from the volume holographic memory 1, only the reference light beam is introduced into the volume holographic memory 1 at the same incident angle β as at the time of recording toward the center of a region in which the signal and reference light beams intersect with each other. In other words, the reproducing of the recorded data is different from the recording of the data in that the signal light beam is snot introduced into the volume holographic memory 1. Therefore, the volume holographic memory 1 diffracts the reference light beam at the intersection of the refractive index grating caused by interference fringes. The diffracted light from the refractive index grating recorded in the volume holographic memory 1 is guided through a lens 21 to a photodetector such as a Charge Coupled Device (CCD) 22 on which a light and dark pattern image i.e., an image of the data arrangement is reproduced. The CCD 22 converts the received image into variations in intensity of an electric signal to output to a decoder 26 an analog electric signal having a level corresponding to a distribution of brightness in the incident image. The decoder 26 compares the analog electric signal with a predetermined amplitude i.e., a slice level to reproduce data consisting of the corresponding "1" and "0".

Since the volume holographic memory records two-dimensional plane data sequences as described above, angle multiplexing recording can be performed by changing the incident angle β of the reference light beam. Specifically, a plurality of two-dimensional planes, i.e., the recorded units, can be defined within the volume holographic memory by changing the incident angle β of the reference light beam. Consequently, three-dimensional recording can be carried out. Examples of angle multiplexing recording are described in Japanese Unexamined Patent Publications Kokai Nos. H2-142979 and H10-97174.

In a conventional so-called one-color holographic memory system which employs only one laser emitting light of one wavelength as a single light source for both the signal and reference light beams, interference fringes are recorded at a site within the volume holographic memory in which these coherent signal and reference light beams intersect with each other. After recording, since light travels straight, previous recorded information existing on respective optical paths are erased by these signal and reference light beams.

To eliminate this trouble, a so-called two-color holographic memory system has been under investigation. In this system, a gate light beam of a different wavelength for enhancing the photo-sensitivity of the volume holographic memory is introduced into the volume holographic memory, simultaneously with the irradiation of signal and reference light beams, to record interference fringes at a site to which the signal light beam, the reference light and the gate light beam are irradiated.

However, since the gate light beam is absorbed into the volume holographic memory, the intensity of the gate light beam at recording positions differs depending on the depth, if the intensity of the gate light beam incident on the volume holographic memory is fixed. For this reason, a difference in depth at recording positions would result in a difference in the speed of recording interference patterns.

OBJECTS AND SUMMARY OF THE INVENTION

It is therefore an object of the present invention to provide an apparatus which is capable of recording interference patterns in a volume holographic memory at a constant recording speed irrespective of the depth to which the incident gate light beam penetrates.

According to the present invention, there is provided an optical information recording/reproducing apparatus for recording data on a holographic memory formed of a photorefractive crystal and reproducing data from the holographic memory, said apparatus comprising:

a support portion for detachably supporting a holographic memory;

a reference light beam supplying portion for supplying a coherent reference light beam of a first wavelength into the holographic memory;

a signal light beam supplying portion for supplying a coherent signal light beam of the first wavelength which is modulated in accordance with image data, into the holographic memory such that said coherent signal light beam intersects with the reference light beam to produce an optical interference pattern with said reference and signal light beams;

a gate light beam supplying portion for supplying a gate light beam of a second wavelength into the holographic memory, the gate light beam enhancing a photo-sensitivity of the holographic memory for one of activating and deactivating of a refractive index grating in accordance with the presence or absence of said optical interference pattern;

a photo-detecting portion for detecting a diffracted light caused from the refractive index grating of the holographic memory by irradiation of the reference light beam; and a regulating portion for changing a light intensity of the gate light beam in accordance with the irradiating form of the gate light beam, for example, an optical path length of the gate light beam from an incident position of the gate light beam to a region in which the signal light beam and the reference light beam intersect with each other within the holographic memory.

According to one aspect of the present invention, said gate light beam supplying portion includes a super-luminescent diode.

According to another aspect of the present invention, said gate light beam supplying portion includes a restricting portion for limiting the gate light beam irradiated in the region in which the signal light beam and the reference light beam intersect with each other.

According to a further aspect of the present invention, the holographic memory includes a cylindrical body made of a uniaxial crystal having an optical crystallographic axis sin parallel with an axis of rotational symmetry, and said apparatus further comprises a transferring portion for moving the cylindrical body in a direction of the optical crystallographic axis, and for rotating the cylindrical body about the axis of rotational symmetry.

According to a still further aspect of the present invention, the holographic memory is a rectangular solid made of a uniaxial crystal having an optical crystallographic axis in parallel with one surface thereof, and said apparatus further comprises a moving portion for moving the reference light beam with respect to the holographic memory.

DETAILED DESCRIPTION OF THE PREFERRED EMBODIMENTS

Preferred embodiments of an optical information recording and reproducing apparatus according to the present invention will hereinafter be described with reference to the accompanying drawings.

Figure 1:
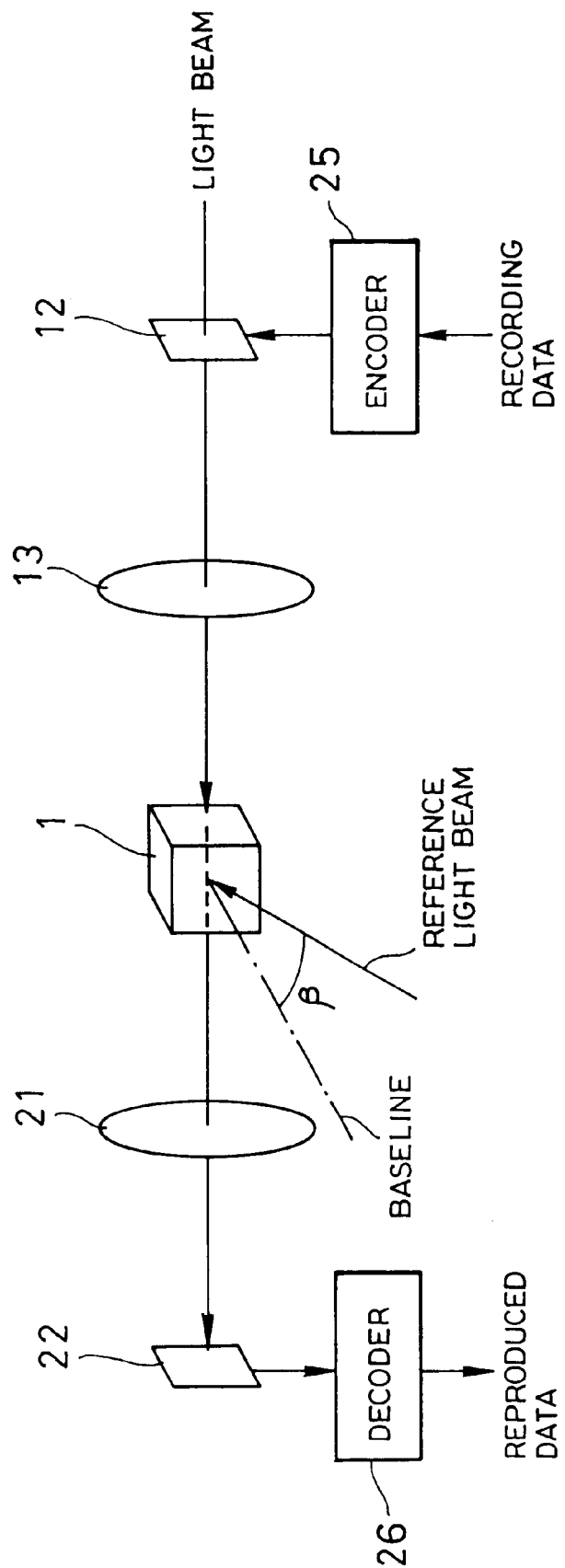
FIG. 1 diagram illustrating the structure of a conventional volume holographic memory system.
Figure 2:
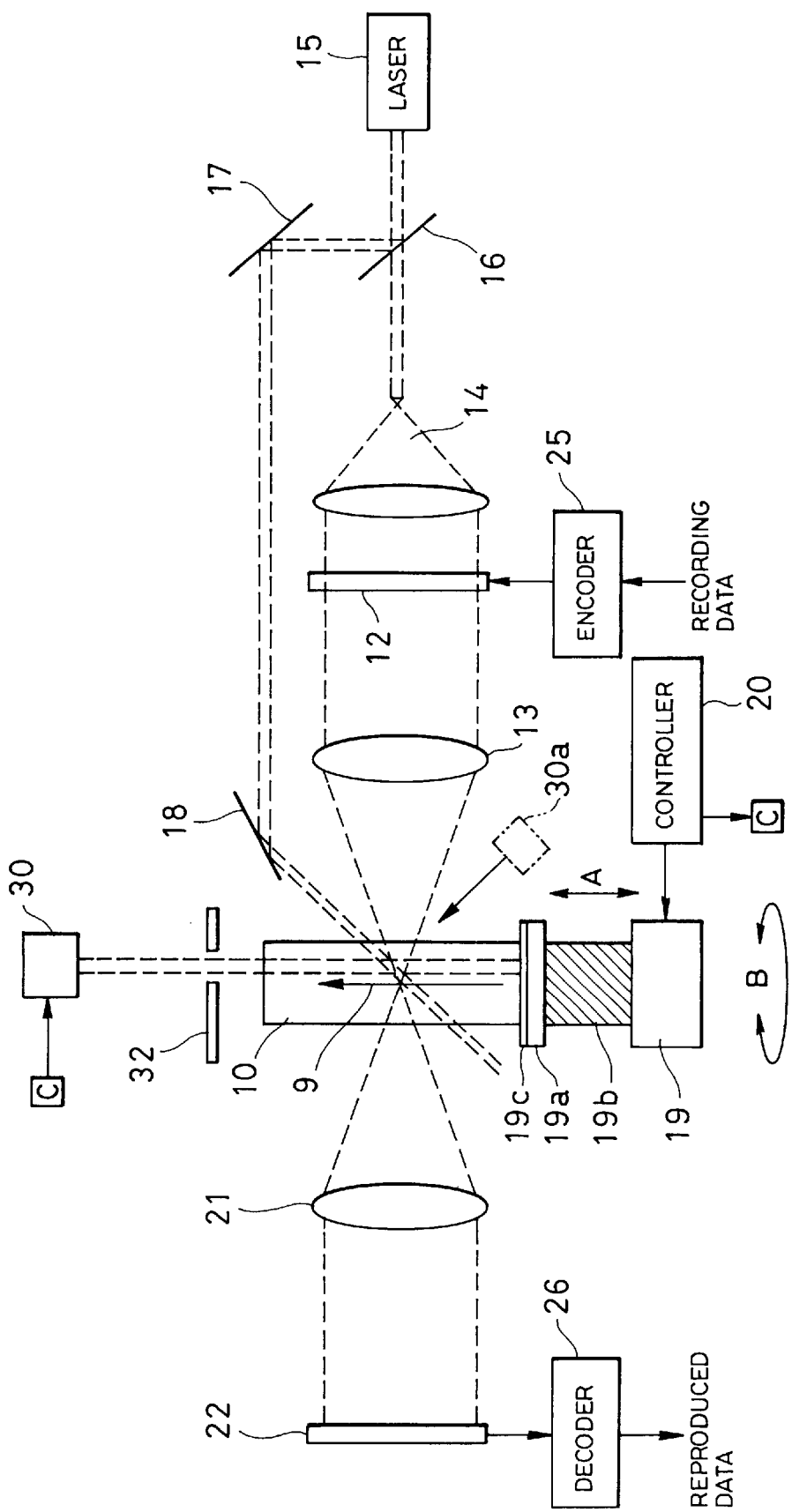
FIG. 2 is a side view illustrating the structure of a volume holographic memory system according to the present invention.

FIG. 2 illustrates a side view of an optical information recording and reproducing apparatus. During recording, a light beam emitted from a laser 15 is divided by a beam splitter 16 into two, i.e., a source light beam and a reference light beam. The resultant light beams are guided to a beam expander 14 and a mirror 17, respectively. The beam expander 14 expands the source light beam to collimated light having a predetermined diameter which is incident on a spatial light modulator 12. The spatial light modulator 12 converts the source light beam from the beam expander 14 to a signal light beam in accordance with digital recording data supplied from an encoder 25. The spatial light modulator 12 is, for example, a two-dimensional plane LCD having 480 pixels in the vertical direction and 640 pixels in the horizontal direction (480×640).

The resultant signal light beam is converged by a lens 13 to pass toward the volume holographic memory 10. In this embodiment, the lens 13 constitutes a Fourier transform system together with a lens 21 below. The cylindrical volume holographic memory 10 is positioned such that a Fourier plane formed by the lens 13 is parallel with the axis of rotational symmetry of the volume holographic memory 10. The volume holographic memory 10, which is formed of a photo-refractive crystal, is a cylindrical body of a uniaxial crystal such as $LiNbO_3$ or the like which has an optical crystallographic axis parallel with the axis of rotational symmetry.

In the reference light beam optical system, the reference light beam is reflected by stationary mirrors 17 and 18 to impinge on the volume holographic memory 10. Inside the volume holographic memory 10, the reference light beam intersects with the signal light beam supplied from the lens 13 to create three-dimensional interference fringes. It should be noted that the optical systems including the mirror 18, the lens 13 and so on are positioned in such a manner that the reference and signal light beams do not interfere just on the Fourier plane but in front of (or behind) the Fourier plane.

A super-luminescent diode 30 for generating a gate light beam is disposed above the top surface of the volume holographic memory 10. The gate light beam is introduced in to the cylindrical memory so as to travel parallel to the rotational symmetry axis thereof. The gate light beam includes a light component of a second wavelength which is different from the wavelength of the reference and signal light beams, and increases the photo-sensitivity of the volume holographic memory 10. The gate light beam activates or inactivates a refractive index grating in accordance with the presence or absence of a optical interference pattern within the volume holographic memory 10. Thus, the gate light beam also serves as an erasure light on the refractive index grating which is produced by the optical interference pattern. The super-luminescent diode 30, which serves as a gate light beam generating portion, is positioned to irradiate a gate light beam only to a limited region in which the signal and reference light beams intersect with each other within the volume holographic memory 10. The super-luminescent diode 30 is ON/OFF controlled by the controller 20. Also, a mask 32 having an opening may be additionally provided for locally limiting the irradiation of the gate light beam through the opening to the region in which the signal and reference light beams intersect with each other.

In the case that a Fourier plane exists within the volume holographic memory, the signal light beam exhibits its maximum intensity on the Fourier plane. Therefore, when the reference light beam interferes with the zeroth light of the signal light beam having a high light intensity on the Fourier plane, the photorefractive effect will saturate, so that there occurs a tendency in that a nonlinear distortion is introduced in a recorded image. The optical systems constituting the apparatus may be positioned such that the reference and signal light beams interfere with each other in front of or behind the Fourier plane to carefully avoid the problem of nonlinear distortion.

The cylindrical volume holographic memory 10 is disposed on a moving portion for moving the cylindrical volume holographic memory 10 at a predetermined interval pitch in the direction of its optical crystallographic axis, as well as for rotating the cylindrical volume holographic memory 10 about the axis of rotational symmetry at a predetermined angle pitch, e.g., it is a vertical movement and rotation mechanism. The vertical movement and rotation mechanism comprises a driver 19, and a vertical movement mechanism 19b coupled to the driver 19 and having a rotating table 19a. The driver 19 is controlled by the controller 20 to rotate and vertically move the table 19a. A surface of the table 19a in contact with the volume holographic memory 10 is covered with a light absorbent material 19c for preventing some stray light caused from the gate light beam.

The volume holographic memory 10 is detachably placed on the table 19a such that its crystal optical axis 9 matches the axis of rotation of the driver 19. The rotation of the driver 19 causes the volume holographic memory 10 to move in a direction indicated by an arrow "A" in FIG. 2, and simultaneously to rotate in a direction indicated by an arrow "B" in FIG. 2. As the volume holographic memory 10 vertically moves in the direction of the arrow "A", a recording position of interference fringes created by the reference light and the signal light beam within the volume holographic memory 10 is shifted in the direction of the arrow "A", thereby realizing spatial multiplexing recording. Also, as the volume holographic memory 10 rotates in the direction of the arrow "B" together with the table 19a, a recording surface of an interference pattern rotates, thereby realizing angle multiplexing recording and spatial multiplexing recording.

While this embodiment shows a moving mechanism for simultaneously performing the angle multiplexing recording and the spatial multiplexing recording, it is also possible to use only one of the mechanism for vertical movements of the volume holographic memory 10 along the crystal optical axis (in the direction of the arrow "A") or the mechanism for rotation of the volume holographic memory 10 (in the direction of the arrow "B") to perform only one multiplexing recording.

The controller 20 controls the super-luminescent diode 30 for generating the gate light beam. The controller 20 includes a regulating portion i.e., intensity adjusting means for changing the intensity of the gate light beam in accordance with the length of an optical path of the gate light beam from its incident position to a region at which the signal and reference light beams intersect with each other in the volume holographic memory 10. Thus, the controller 20 can control a data recording speed and a reproducing speed, as well as the intensity of the gate light beam, by appropriately controlling the rotational speed of the rotation mechanism.

Also, in place of the vertical movement and rotation mechanism, it is possible to employ a moving mechanism which can be separately controlled to move the volume holographic memory 10 in the direction of the crystal optical axis sand to rotate the volume holographic memory 10. For example, a supersonic motor or the like may be used for rotating the volume holographic memory 10, while a separate uniaxial moving stage may be used for moving the volume holographic memory 10 in the direction of the crystal optical axis.

During reproduction, on the other hand, the volume holographic memory 10, which has been recorded in the aforementioned manner, is mounted on the rotation mechanism, as it is during recording. After that, only the reference light beam from the mirror 18 is sallowed to impinge on the volume holographic memory 10 by closing a shutter in the optical path of the source light beam and turning off the super-luminescent diode 30 under the control of the controller 20. Then, diffraction light diffracted from the interference fringes recorded in the volume holographic memory 10 is made incident as a reproduced light beam on the CCD 22 through the inverse Fourier transform lens 21 to form a reproduced image. The CCD 22 has a two-dimensional light receiving surface made up of 480×640 pixels similarly to the spatial light modulator 12. The CCD 22 transduces the reproduced light received thereby to an electric signal which is output to a decoder 26. The decoder 26 compares the input electric signal with a predetermined slice level, and outputs binary digital data.

While in the foregoing embodiment, the cylindrical volume holographic memory 10 is positioned such that its crystal optical axis is oriented upward, the cylindrical volume holographic memory 10 may be positioned such that the crystal optical axis is oriented downward as long as it is coaxial with the axis of rotation of the rotation mechanism. Also, while the foregoing embodiment has been described for the structure in which the gate light beam generated from the super-luminescent diode 30 is incident on the top surface of the cylindrical volume holographic memory 10, the gate light beam may be incident on the side surface of the volume holographic memory 10, as indicated by 30a in FIG. 2.

Figure 3:
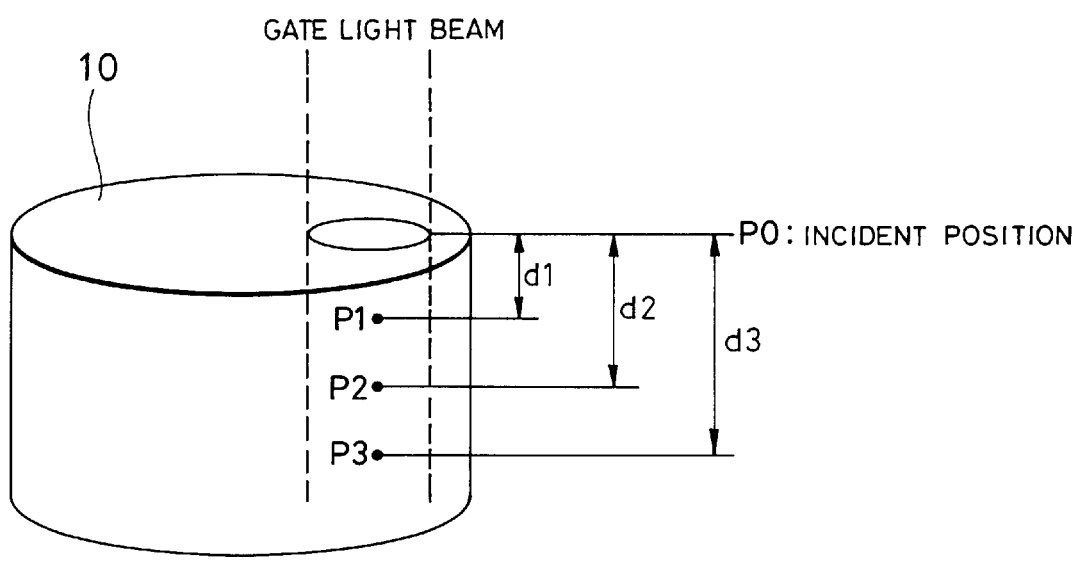
FIG. 3 is a perspective view illustrating a volume holographic memory according to the present invention.

Now, description will be made on a control method performed by the controller 20 for introducing the gate light beam into the cylindrical volume holographic memory 10 from the top surface thereof, as illustrated in FIG. 3.

Assuming that the intensity of the gate light beam incident on a medium is "Iin", and the absorption coefficient of the volume holographic memory for the gate light beam is $\alpha$, then the recording intensity "I" varies depending on a particular recording position of the hologram. The recording intensity I may be approximately expressed as $I = Iin \cdot exp(-\alpha \cdot di)$ (where, di indicates the length of the optical path of the gate light beam from its incident position to a region in which the signal and reference light beams intersect with each other, and $i=1,2,3,\ldots$). On the other hand, since the volume holographic memory hardly absorbs the signal and reference light beams, the recording speed will vary unless the intensity of the gate light beam is made consistent at all recording positions during actual recording. The difference in recording speed will appear as the difference in diffraction efficiency of the recorded hologram. In this example, the intensity "Iin" of the gate light beam incident on the medium may be corrected to match the intensity of the gate light beam at a position "Pi" (where $i=1,2,3,\ldots$).

Approximately, the corrected intensity "IinI" of the incident gate light beam can be expressed as $IinI = Iin \cdot exp[-\alpha \cdot (di-dj)]$, where "i" indicates a reference recording position, "j" indicates an actual recording position, and di and dj indicate the lengths of optical paths of the gate light beam from its incident position to the reference recording position "i" at which signal and reference light beams intersect, and to the actual recording position "J", respectively. The intensity of the gate light beam can be made consistent at any recording positions when the gate light beam is corrected by the controller 20 in the manner described above, and accordingly the diffraction efficiency can be made uniform for reading.

When the gate light beam is incident obliquely to an incident plane, the uniform diffraction efficiency can be realized by measuring the di value along the optical path of the gate light beam to determine a correction coefficient.

Figure 4:
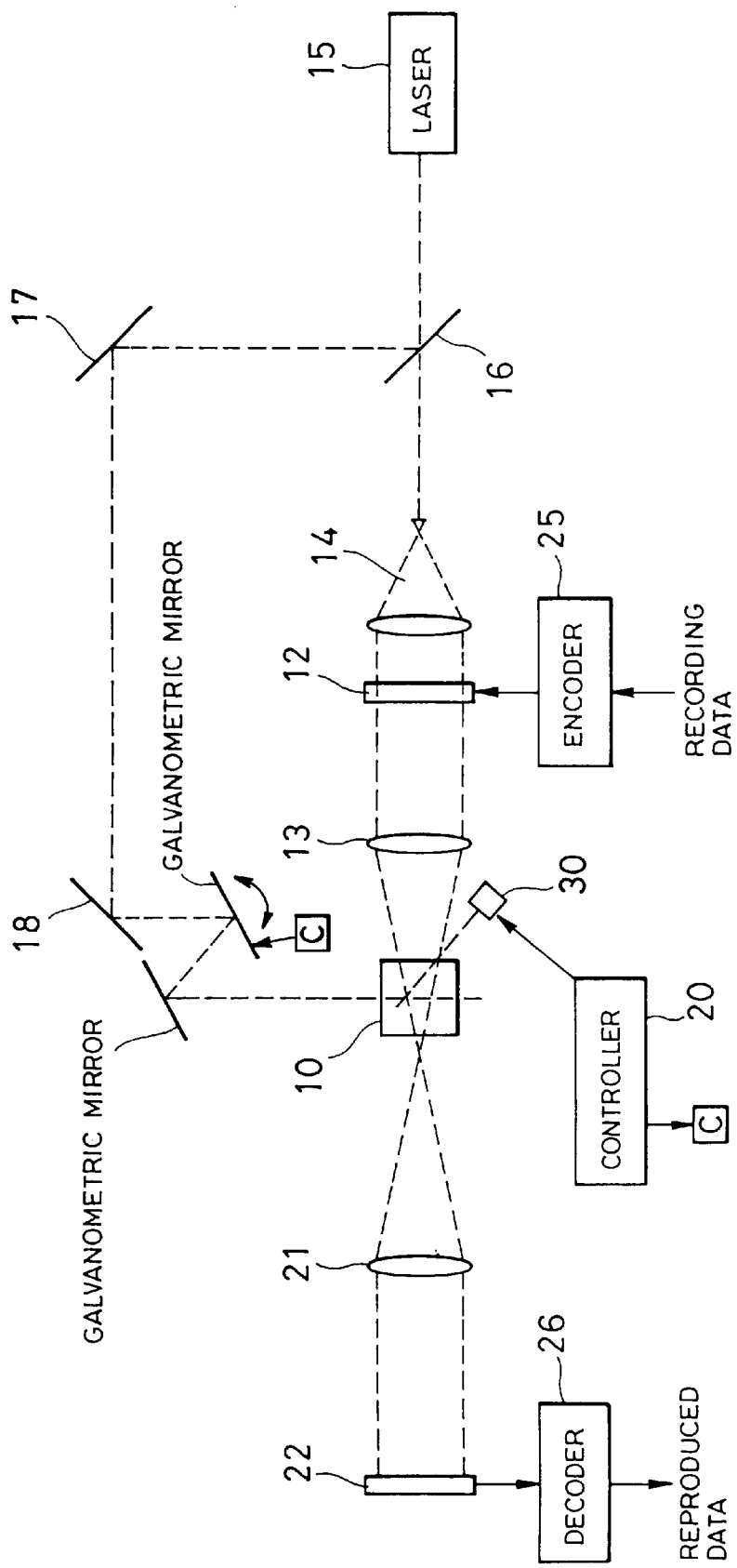
FIG. 4 is a side view illustrating the structure of another volume holographic memory system according to the present invention.

Also, while the foregoing embodiment has been described in connection with the cylindrical volume holographic memory 10, a volume holographic memory of photorefractive crystal may be implemented as a rectangular solid 10 made of a uniaxial crystal which has its optical crystallographic axis parallel with one surface thereof, as illustrated in FIG. 4, in which case the volume holographic memory 10 can be applied to an angular multiplexing recording system which employs a pair of galvanometer mirrors for changing the incident angle $\beta$ of reference light to the volume holographic memory.

As described above, the present invention employs a volume holographic memory in a cylindrical shape which is rotated for angle multiplexing recording and spatial multiplexing recording. Meanwhile, as the length of optical path of the gate light beam within the medium becomes longer when the gate light beam is introduced into the volume holographic memory from the bottom surface or the top surface of the cylindrical volume holographic memory, or when the gate light beam is introduced into the cylindrical volume holographic memory from the side surface and the incident angle is swung for angle spatial multiplexing in the depth direction, the power of the gate light beam can be enhanced accordingly, so that high density recording can be accomplished.

In addition, while the foregoing embodiment has been described in connection with the volume holographic memory, but the present invention is snot limited thereto. Another type of media such as a flat plate, disc or the like may be employed for the holographic memory of photorefractive crystal in the invention.

What is claimed is:

1. An optical information recording/reproducing apparatus for recording data on a holographic memory formed of a photorefractive crystal and reproducing data from the holographic memory, said apparatus comprising:

a support portion for detachably supporting the holographic memory;

a reference light beam supplying portion for supplying a coherent reference light beam of a first wavelength into the holographic memory;

a signal light beam supplying portion for supplying a coherent signal light beam of the first wavelength which is modulated in accordance with image data, into the holographic memory such that said coherent signal light beam intersects with the reference light beam to produce an optical interference pattern with said reference and signal light beams;

a gate light beam supplying portion for supplying a gate light beam of a second wavelength into the holographic memory, the gate light beam enhancing a photosensitivity of the holographic memory for one of activating and deactivating of a refractive index grating in accordance with the presence or absence of said optical interference pattern;

a photo-detecting portion for detecting a diffracted light caused from the refractive index grating of the holographic memory by irradiation of the reference light beam; and a controller that includes a regulating portion for changing a light intensity of the gate light beam in accordance with an optical path length of the gate light beam from an incident position of the gate light beam to a region in which the signal light beam and the reference light beam intersect with each other within the holographic memory.

2. An apparatus according to claim 1, wherein said gate light beam supplying portion includes a super-luminescent diode.

3. An apparatus according to claim 1, wherein said gate light beam supplying portion includes a restricting portion for limiting the gate light beam irradiated in the region in which the signal light beam and the reference light beam intersect with each other.

4. An apparatus according to claim 1, wherein the holographic memory includes a cylindrical body made of a uniaxial crystal having an optical crystallographic axis sin parallel with an axis of rotational symmetry, and said apparatus further comprises a transferring portion for moving the cylindrical body in a direction of the optical crystallographic axis, and for rotating the cylindrical body about the axis of rotational symmetry.

5. An apparatus according to claim 1, wherein the holographic memory is a rectangular solid made of a uniaxial crystal having an optical crystallographic axis sin parallel with one surface thereof, and said apparatus further comprises a moving portion for moving the reference light beam with respect to the holographic memory.

\* \* \* \* \*